May 4, 1948.  W. BRADFORD  2,441,005
SIX HEAT PAD
Filed May 1, 1947

INVENTOR
WILLIAM BRADFORD
BY Chapin & Neal
ATTORNEYS

Patented May 4, 1948

2,441,005

UNITED STATES PATENT OFFICE 2,441,005

SIX HEAT PAD

William Bradford, Taunton, Mass.

Application May 1, 1947, Serial No. 745,206

3 Claims. (Cl. 219—46)

This invention relates to electrical heating pads for therapeutic purposes. It has for one object the production of a pad which has greater adaptability in its application to the human body than conventional pads. A further object is to provide a pad which shall have available six distinct heats insead of the conventional three, and to do this without using more than one control thermostat nor more than three wires leading into the pad. A further object is to modify the pad shown in the Taylor Patent 2,237,852, April 8, 1941, so that six distinct heats will be obtained.

The invention will now be described in connection with the accompanying drawing, in which Fig. 1 is a diagram of the wiring, showing the circuit of the Taylor patent as modified by the present invention;

Figure 1:
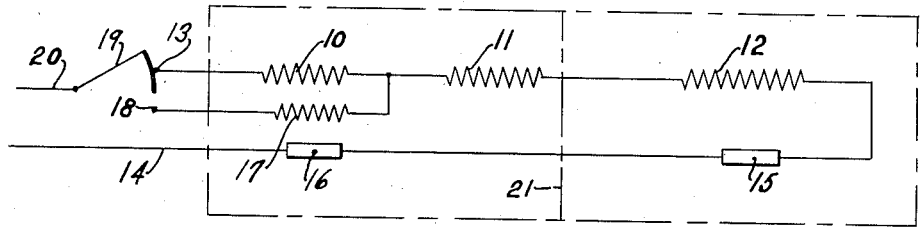

The basic circuit is thoroughly described in the Taylor Patent 2,237,852, and need be discussed here but briefly. As used in the present case the main heater coil is formed in three series sections 10, 11, and 12, one end of which is connected to a switch point 13 and the other to one branch 14 of the current supply line through series thermostats 15 and 16. For reasons to be pointed out below the former is preferably set for a higher temperature than the latter and acts solely as a safety device. Tapped off between the sections 10 and 11 is a resistance 17 connected to a switch point 18 and operating as a heater for the thermostat 16. The movable switch member 19, which is connected to the second side 20 of the line, is capable of contacting the switch point 18, the switch point 13, or both simultaneously. When connected to the point 18 alone all the current which passes through the main heating coil likewise passes through the thermostat heater 17. The thermostat 16 is exposed to the heat generated by the main heating coil, as is the thermostat 15, but in addition the thermostat 16 is subjected to the action of the heating coil 17. When all of the current passes through the thermostat heater 17, as in the case of the switch setting just described, maximum heating of the thermostat 16 will result, and it will turn off while the pad itself is at a relatively low heat. When both the switch points 13 and 18 are simultaneously in contact with the member 19 part of the current only will pass through the heater 17, causing the pad to be kept at a medium temperature; while when the member 19 contacts the point 13 only no current will pass through the heater 17 and the thermostat 16 will respond directly to the temperature of the pad, and will hold the latter constant at a high heat.

It is desirable to have as many gradations in the heat of the pad as may be possible without the introduction of undue complexities, and in the present instance I have found a simple way of doubling the degrees of heat obtainable by the circuit described above. The basic circuit is capable of producing any desired separation of the high, medium and low pad temperatures by suitable adjustment of the values of the ballast resistance 10 and the thermostat heater 17, as is fully discussed in the Taylor patent cited. By proper choice of these values the doubling of heats produced by the present invention can be made to form a complete series of six evenly spaced temperatures, a matter which as far as I am aware has never before been accomplished with a single non-variable control thermostat.

Figure 2:
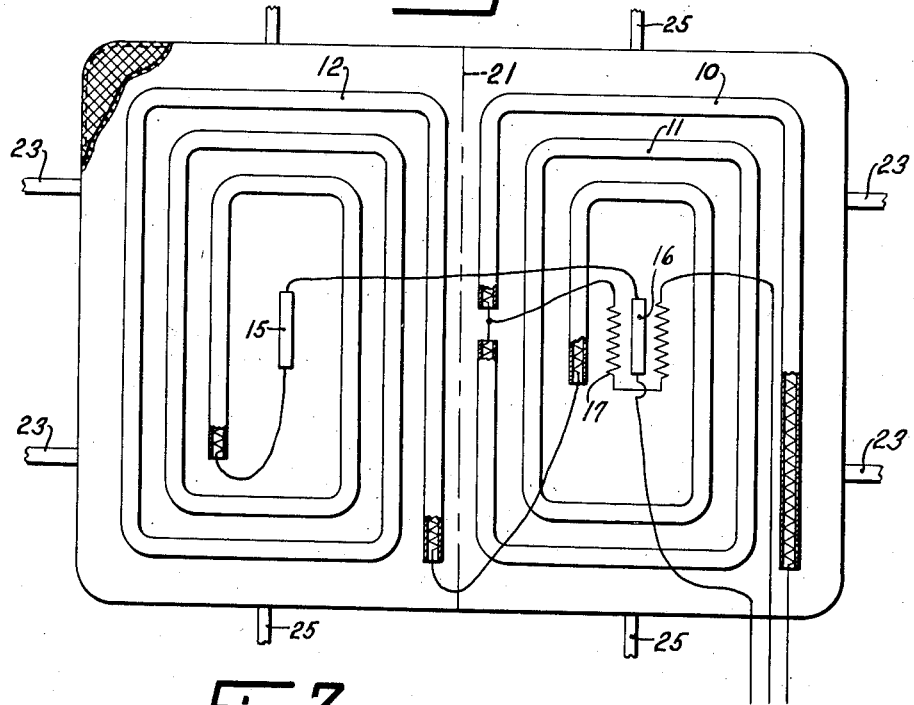
Fig. 2 is a diagram of a pad showing the way in which the wiring is arranged relative to the pad so that the circuits shown in Fig. 1 will be realized.

To accomplish this result the pad is made in two sections, one containing the heater 12 and the safety thermostat 15 and the other the heaters 10, 11 and 17 and the control thermostat 16, and is made to fold along a hinge line 21 shown in dash lines in both Fig. 1 and Fig. 2. The pad can be used either opened up as in Fig. 2 or folded over upon itself as in Figs. 3 and 4 in which it is of convenient shape to be used for example on the neck or forehead. When the pad is open or in the position of Fig. 3, with the control thermostat 16 away from the surface 22, what may be termed the normal range of temperatures will be obtained, while with the pad in the position of Fig. 4 the temperature of the pad in contact with surface 22 will be about 8° F. lower in each setting of the switch. It is clear that by a proper choice of the values of resistances 10 and 17 a complete regular series of spaced apart temperatures can be obtained.

Figure 3:
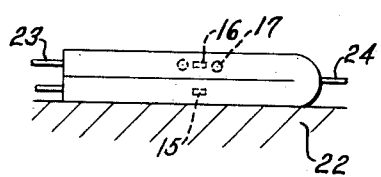
Fig. 3 is an end view of the folded pad showing the position occupied for holding the several heats in their higher ranges.
Figure 4:
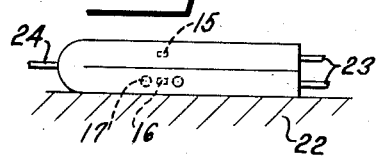
Fig. 4 is a similar view with the pad positioned to give the several heats their lower range.

The reason for this action of the pad is that in the open position of Fig. 2 or the closed position of Fig. 3 the control thermostat 16 is cooled by having the adjacent surface of the pad exposed directly to the air; while in the position of Fig. 4 the insulating and heating action of the other heated half of the pad causes the control thermostat to warm up much more rapidly and therefore keep the pad at a lower temperature by turning off more rapidly. In low and medium heat positions of the switch the control thermostat turns off while the safety thermostat is still unaffected, since the control thermostat is heated by both the pad and the heater 17, while the safety thermostat is heated by the pad only. In the high heat setting, however, the two thermostats are treated alike, and to produce the double temperature effect on high setting it is necessary that the thermostat 15 should have a higher temperature of cut-off than the control thermostat 16 so that there will be no reversal of roles of the two thermostats when the pad is reversed as in Fig. 4 with the switch setting on high.

It is also preferable that the pad be provided with tapes 23 attached to the edges of the pads opposite to the fold line, and tapes 24 to at least one side of the pad at the fold line. By this means the pad can readily be wrapped around an arm or wrist and tied in position whether it is folded or unfolded. Tapes 25 at the end allow the pad to be tied around the neck or forehead when folded.

What I claim is:

1. An electric heating pad having a flexible support provided with a transverse hinge line dividing it into sections, a pair of similar heating resistances in series secured to the support one in each section, a control thermostat in series with the heating resistances and located in one section, a safety thermostat in series with the heating resistances and located in the second section and set to a higher cut-out temperature than the control thermostat, whereby when the pad is folded upon itself and placed upon the surface to be heated a higher degree of heat will be produced when the control thermostat is in that section remote from the surface to be heated.

2. An electric heating pad having a flexible support provided with a transverse hinge line dividing it into two sections, a pair of similar heating resistances in series secured to the support one in each section, a control thermostat in series with the heating resistances and located in one section, a safety thermostat in series with the heating resistances and located in the second section, a thermostat heater coil adjacent the control thermostat, a connection between one end of the thermostat heating coil and an intermediate portion of the main heating resistance located in the first-named section, a power line, a connection between one end of the main heating coil and one side of the power line and switch means for connecting the second branch of the power line to the second end of the thermostat coil, to the second end of the main heating coil, or to both together, whereby with the pad folded upon itself a higher degree of heat will be produced when the control thermostat is in the section remote from the surface to be heated.

3. An electric heating pad having a flexible support provided with a transverse hinge line dividing it into two sections, a pair of similar heating resistances in series secured to the support one in each section, a control thermostat in series with the heating resistances and located in one section, a safety thermostat in series with the heating resistances and located in the second section and set to a higher cut-out temperature than the control thermostat, a thermostat heater coil adjacent the control thermostat, a connection between one end of the thermostat heating coil and an intermediate portion of the main heating resistance located in the first-named section, a power line, a connection between one end of the portion of the main heating coil in the second-named section and one side of the power line, and switch means for connecting the second branch of the power line to the second end of the thermostat heating coil, to the second end of the main heating coil, or to both together, whereby for each setting of the switch with the pad folded upon itself a higher degree of heat will be produced when the control thermostat is in the section remote from the surface to be heated.

WILLIAM BRADFORD.